United States Patent

[11] 3,624,633

[72] Inventor Steven R. Hofstein
Princeton, N.J.

[21] Appl. No. 876,286
[22] Filed Nov. 13, 1969
[45] Patented Nov. 30, 1971
[73] Assignee Princeton Electronic Products, Inc.
Princeton, N.J.

[54] DISPLAY SYSTEM UTILIZING MULTIFUNCTION STORAGE TUBE
9 Claims, 8 Drawing Figs.

[52] U.S. Cl. .......... 340/324 A,
315/8.5, 328/124, 315/10, 340/173 CR
[51] Int. Cl. .......... G06f 3/14
[50] Field of Search .......... 340/324 A,
173 CR; 315/8.5, 8.6; 328/123, 124

[56] References Cited

UNITED STATES PATENTS

| | | | |
|---|---|---|---|
| 2,576,029 | 11/1951 | Mohr | 315/8.5 X |
| 2,855,540 | 10/1958 | Hoover et al. | 340/173 CR |
| 2,984,790 | 5/1961 | Mallebrein | 328/124 |
| 3,336,498 | 8/1967 | Castanera | 340/324 A X |
| 3,344,239 | 9/1967 | Ragland | 340/324 A X |

*Primary Examiner*—John W. Caldwell
*Assistant Examiner*—David L. Trafton
*Attorney*—Samuelson & Jacob

ABSTRACT: A display system is disclosed, utilizing a hybrid storage tube the target of which includes a matrix area, an information storage area, and beam-readable coordinate indicia thereon. Display control means, which may be in communication with a computer and a keyboard, are present in the system, and serve to control transfer of data from matrix to information storage areas, as well as read out from the storage area. Said control means also activate a CRT display means to display information read out from said storage area.

Fig. I

INVENTOR.
STEVEN R. HOFSTEIN
BY Samuelson & Jacob
ATTORNEYS

INVENTOR.
STEVEN R. HOFSTEIN
BY Samuelson & Jacob
ATTORNEYS

INVENTOR.
STEVEN R. HOFSTEIN
BY Samuelson & Jacob
ATTORNEYS

INVENTOR.
STEVEN R. HOFSTEIN
BY Samuelson & Jacob
ATTORNEYS

DISPLAY SYSTEM UTILIZING MULTIFUNCTION STORAGE TUBE

This invention relates generally to electronic display apparatus and methodology, and more specifically relates to apparatus facilitating generation and CRT display of alphanumeric symbols or the like.

In numerous applications of modern electronic technology it becomes desirable to display for visual presentation, information composed of alphanumeric symbols or the like. In the case of a computer terminal, for example, one may desire to derive from or through the computer, specific alphanumeric data representative of a solution provided by the computer to a problem presented thereto. Typically, and most conveniently, such alphanumeric data will be displayed as a light pattern on the face of a cathode-ray tube (CRT), and in consequence enormous amounts of time and effort have been expanded by researches in developing techniques and systems facilitating such display.

The problem of providing via relatively simple and compact components a system capable of generating and displaying alphanumeric information, is not, however, a simple one, particularly when one considers that it is not usually a single character that is to be generated, but rather a sequence of characters and/or symbols—which in combination yield informational content. Prior efforts to develop such systems for CRT display have thus yielded much and varied results, but by and large such prior systems have tended to be overly complex, expensive to construct, overly bulky for terminal installations or similar limited space environments, or have suffered from a combination of these several defects. Where, for example, the source of character generating signals is not an actual matrix present in the system, large amounts of storage and circulating delay lines or the like must be provided both for the bit sequence representative of individual characters and for the serial stream of such bits which one commonly assembles for intensity modulating the CRT display electron beam to yield the desired message. Where, on the other hand, an actual physical matrix is utilized—as in the well-known monoscope approach to character generation—a plurality of evacuated tubes, electron guns, etc. is commonly present; moreover separate and distinct memory elements are required for retaining data respecting the sequence and location of symbols to be generated and displayed.

In yet another approach, the characters to be displayed are first written on a storage tube target, the latter then serving to provide a readout for modulating the CRT display. Again, however, this approach has in the past been characterized by the presence of separate storage tube (or tubes) and character matrix devices or other sources of character forming signals. It may also be observed in connection with all of these techniques which require initial positioning of an electron beam—e.g. for writing on a storage tube target or for scanning a selected character in a matrix to thereby derive modulating signals for CRT display—that much bulk and expense has resulted from the fact that complex D/A converters have customarily been employed for converting digitally described coordinates to deflection voltages for the electron beam.

In accordance with the foregoing it may be regarded as an object of the present invention to provide a simple, compact display system, capable of communicating with a computer or the like, and generating for continuous CRT display, alphanumeric characters and sequences of such characters.

It is a further object of the invention to provide a CRT display system, wherein character generation and sustained storage of composed messages for continuous readout thereof is combined in a single, simple portion of the system.

It is yet another object of the invention, to provide a CRT display system wherein electron beam reading of a character matrix present therein, and electron beam writing on a storage surface of characters read out from said matrix, is facilitated by beam locating and positioning means which are exceedingly simple in nature and which eliminate the necessity for digital to analog conversion techniques.

It is a yet further object of the invention, to provide a multifunction storage tube, for use in display systems, photocomposing systems, or the like, which incorporates in a single compact structure the functions of character generation, storage of the thereby generated characters and message format, and means to detect and identify the position of the electron beam in such tube whereby to facilitate selection of characters and composing of messages therefrom.

It is a still further object of the present invention, to provide a storage tube target, incorporating electron beam-readable indicia thereon in such a manner that beam positioning on the target is enabled in an exceedingly simple and expeditious manner.

Now in accordance with the present invention, the foregoing objects, and others will become apparent in the course of the ensuing specification, are achieved by a system which incorporates as its central element a multifunction—or "hybrid" storage tube. The said tube includes a target having thereon a character matrix area, preferably including a stenciled character matrix, and a separate storage area capable of storing for sustained periods and for repeated readout, characters "transferred"from said matrix area thereto. A display control is present in the system which may be in communication with a computer and a manually operated keyboard. In response to signals from said control, characters are read from said matrix by the electron beam in the tube, and via an intermediate buffer register are then written at the said storage area. Beam-readable indicia present at the target face enable rapid and accurate positioning of the electron beam without use of digital-to-analog converters. Upon completion of message composition, display on a CRT face is accomplished by repeated readout of the stored charge pattern, utilizing the thereby derived signal in a conventional manner to intensity modulate the scanning CRT display electron beam.

The invention is diagrammatically illustrated, by way of example, in the appended drawings, in which.

Figure 1:
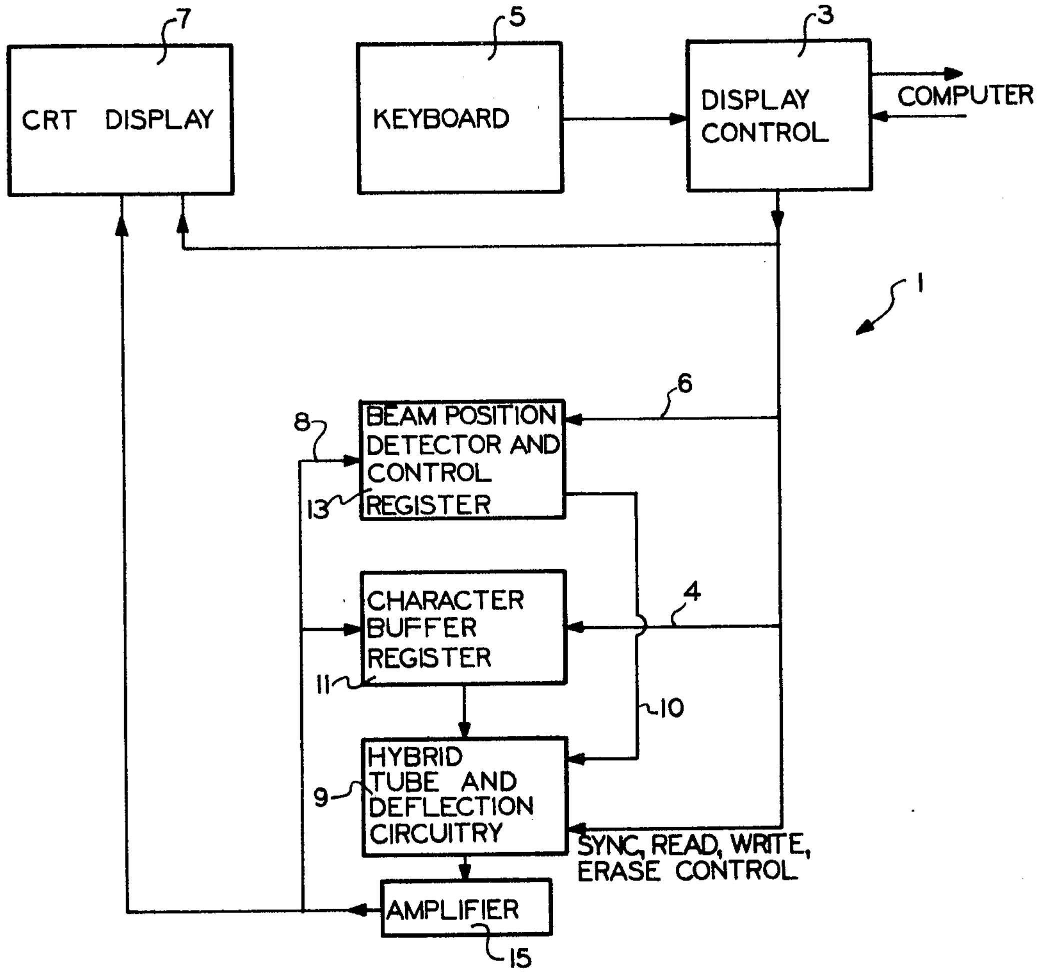
FIG. 1 is a schematic block diagram of a display system in accordance with the invention.

In FIG. 1 a schematic block diagram is shown, depicting a display system 1 in accordance with the invention. It is assumed for purposes of concrete illustration that the system therein shown is in the nature of a computer terminal, and in consequence display control 3, which is the coordinating means activating all other elements of the system and routing all control signals, is shown to be in communication with a computer (not explicitly shown) and with a keyboard 5. However, as will become apparent in the ensuing description, display control 3 need not perform its gating and routing functions in response to computer direction, but may, for example, be directly activated by manual or other means.

Display control 3 is seen to be in electrical connection with CRT display 7, with hybrid tube and deflection circuitry block 9, with character buffer register 11, and with the beam position detector and control register block 13. CRT display 7 is a standard cathode-ray tube display device which in accordance with principles well understood in the art displays illuminated characters on the face thereof as a result of intensity modulation of the scan raster in such tube. In accordance with the present invention the signals for enabling such modulation are gated out from the hybrid tube of block 9 in response to signals from display control 3, which also provides signals to display 7 and the deflection circuitry of block 9 to enable proper synchronization between the scanning readout beam in the hybrid tube and the modulated beam in display 7.

Hybrid tube and deflection circuitry block 9 will be described in greater detail in connection with FIGS. 2 through 7. For purposes of FIG. 1 it is sufficient to observe that the hybrid storage tube and deflection circuitry of this block 9 make up a unitized structure which incorporates a target element having thereon a character stencil, an electrostatic charge pattern storage area, and electron beam-readable coordinate indicia. In response to signals emanating from display control 3, electrostatic charge patterns indicative of characters on the said stencil are written in the said storage areas, the stored pattern thereafter serving to provide those signals mentioned in the preceding paragraph which modulate CRT display 7. More specifically under the control display control 3 selected portions of the said character matrix are read, and via the loop provided through amplifier 15 and character buffer register 11, signals derived from such matrix control writing on the storage area of target. Since the same electron gun may be used for both matrix reading and storage area writing, the said buffer register 11 provides intermediate buffering, but by proper switching between the reading and writing operations such buffering capacity can be made very small. Positioning of the electron beam of block 9 at specific points of the character stencil and storage area of the target is effected by beam position detector and control register block 13. The latter receives signals from the cited indicia of the storage target via amplifier 15 and line 8 and then provides via line 10 signals indicative of appropriate deflection voltages to place the hybrid tube beam at the selected target points. Coordinate information with respect to the target points to be read, or at which storage is to be effected, is supplied to block 13 via line 6.

Figure 2:
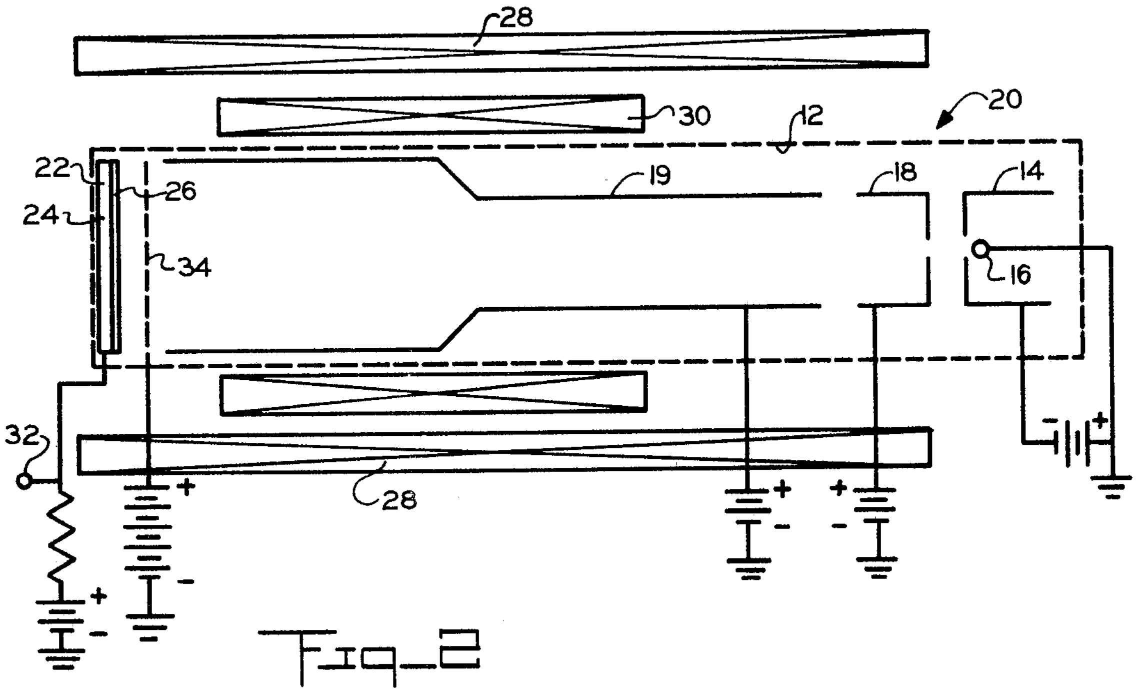
FIG. 2 is a cross-sectional view through the storage tube portion of the display system.

In FIG. 2 a cross-sectional view is shown through a hybrid storage tube 20 in accordance with the invention. This tube 20, in overall appearance, resembles the structure set forth in my copending patent application, Ser. No. 840,698, filed July 10, 1969, entitled "Electronic Storage tube," and assigned to the assignee hereof, with very important differences being present, however, in the structure of the target. The tube 20 is thus seen to comprise an envelope 12, control grid 14, cathode 16, accelerating anode 18, wall anode 19, target 22 which comprises substrate 24 and mosaic layer 26 deflecting coil 28, focusing coil 30, output terminal 32 and decelerating grid mesh 34. As is described in my copending application, writing is effected on storage areas of target 22 by utilizing the write signal for X–Y deflection of the electron beam emitted by cathode 16 or by Z-axis modulation of a raster scanned beam (e.g. by applying the signal to grid 14). The read signal is a normal raster scan electron beam which is applied to said storage areas of the target. During reading of said storage areas, output current proportional to the charge pattern on the target is obtained at output terminal 32. In accordance with the present invention, the electron beam of tube 20 may also be made to sweep selected characters and coordinate indicia present on target 22. Readout signals provided from sweeping of these latter areas will also appear at terminal 32. The output at terminal 32 will thus be routed to CRT display 7, to character buffer register 11, or to beam position detector and control register block 13 (FIG. 1), by commands from display control 3 depending upon which specific portion of target 22 is being scanned. Upon completion of the display process erasure of the charge pattern stored in tube 20 can be brought about in the same manner as is described in my copending application, i.e. by applying e.g. about +20 volts to target 22, setting grid 14 at approximately 0 volts to yield maximum beam current and scanning the area to be erased.

Figure 3:
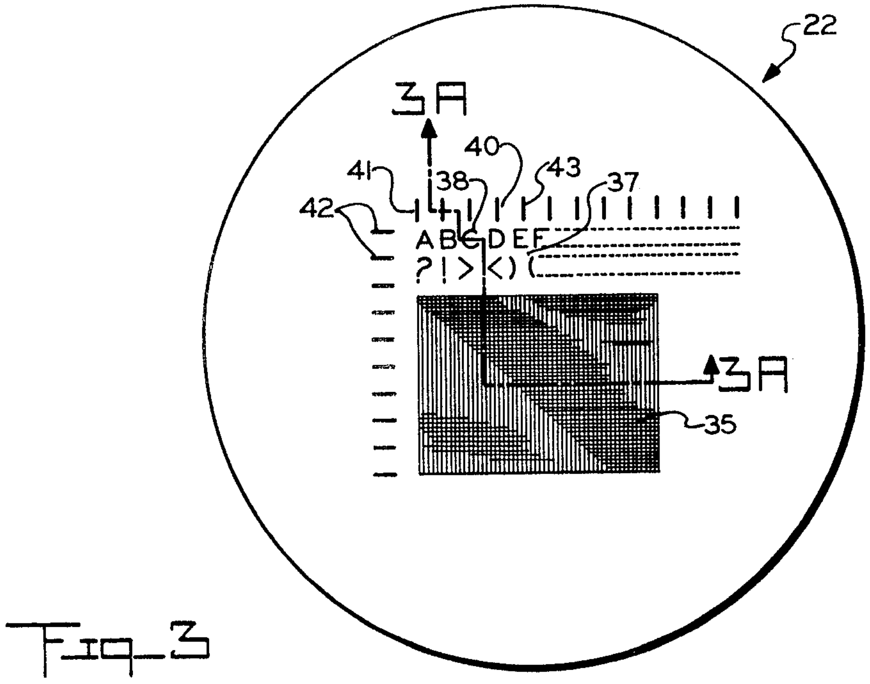
FIG. 3 is a plan view of the target element incorporated in the multifunction storage tube of FIG. 2.
Figure 3A:
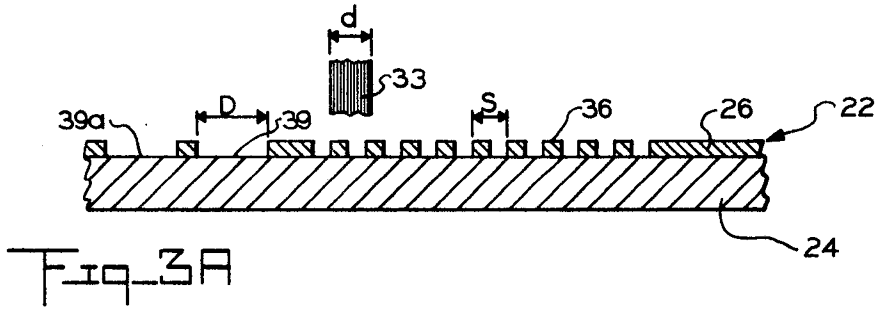
FIG. 3A is a cross-sectional view of FIG. 3 target, taken along the line 3A—3A and depicts the surface of such target on a greatly magnified scale.

THe structure of target 22 is shown in detail in the planar view of FIG. 3 and in the cross-sectional view of FIG. 3A. (In the latter Figure the surface structure of the target is highly magnified in order to emphasize certain details.) As best seen in FIG. 3A the target 22 in a compositional sense is similar to the target disclosed in my cited copending application, and thus includes a conducting substrate 24 upon which is formed an insulating mosaic layer 26. As is set forth in said application substrate 24 is preferably formed of doped silicon (either P or N) and mosaic layer 26 is preferably formed of silicon dioxide, excellent results being achieved where the silicon dioxide layer is genetically derived from the underlying silicon. In accordance with the present invention, however, layer 26 is impressed, as by photoetching techniques or the like, with the distinct areas as shown in FIG. 3.

Firstly, there is formed in layer 26 a storage area 35. This area 35 of the target, is intended to receive charge patterns thereon and have said pattern read out therefrom in a manner exactly corresponding to similar operations described in my application, and may thus in structure be similar to the target described in said application. Such area 35 may thus comprise a series of discrete silicon dioxide islands 36 of the order of 3 to 5 microns on a side (shown in exaggerated scale in FIG. 3A) or a series of silicon dioxide stripes (as in FIG. 6) which islands or stripes overlie the silicon substrate 24. As is described in said copending application, the insulating mosaic at area 35 acts as a coplanar grid during readout, whereby readout current from said area 35 is modulated by the charge pattern present on the mosaic.

Secondly, target 22 now includes a character matrix 37 which is shown in the Figure as being approximately above the storage area 35, but which may be at any other convenient locations on target 22. Individual characters in matrix 37, such as the "C" at reference numeral 38 are formed of a continuous stencillike gap or of a series of dotlike gaps in the silicon dioxide layer. A gap 39 of this type is shown in exaggerated scale in FIG. 3A. It will be seen in FIG. 3A that the dimension "D" of such gap 39 exceed the dimension *d* of the electron beam 33 which scans target 22, a result that is at variance with what may be observed in the fine structure of storage area 35. In that latter case it is seen from FIG. 3A that the mosaic cycle "S," i.e. the distance from the beginning of one island 36 to the beginning of the next island, is actually somewhat less than the electron base diameter *d*. The reason for such variation in structure is that in the present environment there is no intention to modulate beam current by a charge pattern; the matrix 37 rather serves much in manner of a monoscope, to provide in response to electron beam raster scanning of a selected character, a series of distinct signals—or pulses, which signals in the present instance will be stored at area 35 in the precise configuration of the character.

In particular the technique for writing a selected character from matrix 37 on the storage area 35 involves sweeping with a rastered scan the space surrounding the selected character, and using the resulting signal at readout terminal 32 to in turn write the same character as a charge pattern on area 35. Since the tube 20 includes only a single electron gun, it will be evident that simultaneous reading of the matrix character and writing of the character at area 35 is not possible. Accordingly, a character buffer register 11 is utilized during this process to store the readout signals from the matrix which await writing in area 35. In actual practice buffer register 11 need not have a particularly large capacity since the electron beam can readily be switched back and forth between matrix 37 and area 35 during the character writing process. As an example, supposing the character in matrix 37 to be formed of a series of dots in 9×7 configuration, a simple nine digit buffer memory can be employed where one switches between matrix and storage area upon sweeping each column of the 9×7 format. Control signals for gating the signal bits in and out of character buffer register 11 are furnished to the latter via line 4 from display control 3.

In accordance with the present invention, the target 22 further includes thereon coordinate indicia 40, which are readable by the electron beam of tube 20 and which enable in a most expeditious manner, positioning of the said beam for reading of selected characters and for writing of said characters at selected coordinate points in space 35. These coordinate indicia serve in a manner which will be set forth to eliminate the necessity for employing D/A converters or the like in order to position the electron beam in tube 20 for scanning of selected matrix characters or for writing of such characters at selected coordinates of storage area 35.

In FIGS. 3 and 3A, the coordinate indicia 40 are seen to comprise a series of equidistantly spaced lines 43, which are actually voids etched or otherwise formed in layer 26 so as to expose underlying substrate 24. The width of such lines is at least as great as the diameter *d* of the electron beam, and preferably is considerably greater, whereby transverse scan across such line by the electron beam can provide a clearly recognizable and processable signal. For example the width of the line as indicated in FIG. 3A at 39*a*, may be the same as dimension D. The indicia 40 are seen further in the FIG. 3 embodiment, to extend along two tracks 41 and 42 which correspond respectively to X and Y directions in the plane of the target face. While the indicia tracks 41 and 42 are shown here as abounding the perimeter of the character matrix and storage areas, the tracks can be located elsewhere on target 22, provides only that reading thereof can serve to provide digital coordinates which are relatable to the space occupied by matrix 37 and storage area 35. Furthermore the tracks 41 and 42 need not extend in the direction of rectangular axis. Other coordinate systems capable of uniquely locating points on target 22 are applicable; e.g. tracks 41 and 42 can extend along radial and azimuthal axes.

In accordance with the invention, beams positioning for scanning a selected character in matrix 37 and for writing the said character at storage area 35, is effected by sweeping the electron beam along the tracks 41 and 42 and counting the coordinate indicia sensed until a value is reached which matches the desired coordinates furnished by display control 3. As such point is reached, first on the track 41 sweep, and then on the track 42 sweep, the deflection voltage actually present is sensed and temporarily stored, whereby the stored deflection values may then be applied to the deflection circuitry of block 9 to position the beam at the desired point on the target.

Figure 4:
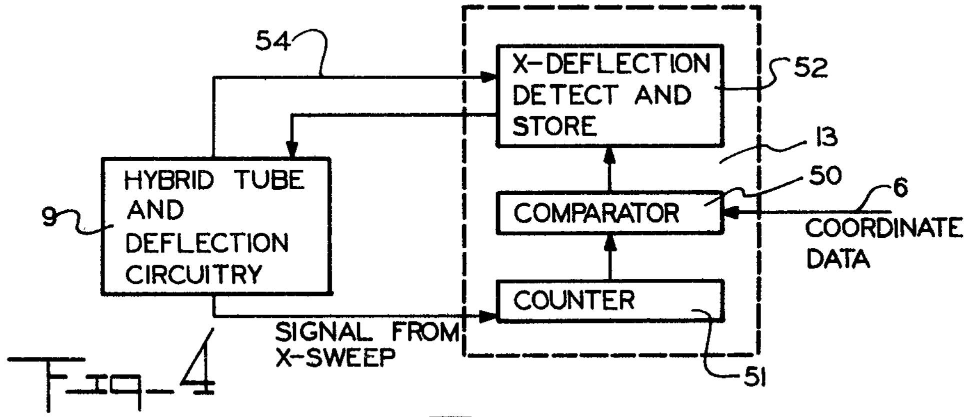
FIG. 4 is a schematic block diagram illustrating the manner in which beam positioning is effected in accordance with the invention.

The sequence of events set forth in the preceding paragraph may perhaps be better understood with the aid of an example. Referring then to FIG. 1 and FIG. 4 we may assume that as a result of operator inquiry via keyboard 5 and display control 3 an incoming signal is applied to display control 3 by the computer which describes a particular character to be written and the location on storage area 35 at which it is to be written. In order to position the beam for reading of the character, coordinate data for the character is fed via line 6 to beam position and control register block 13. More specifically it is seen in FIG. 4 that such data is fed to a comparator 50 which also receives the output from a counter 51 which senses the digital counts produced by sweep of track 41. When comparator 50 senses an equality between the indicia counted and the X-coordinate specified thereto from display control 3, it signals X-deflection and storage block 52 to detect and temporarily store the X-deflection voltage furnished block 52 from hybrid tube and deflection circuitry block 9. The beam is then returned to its zero-zero starting position and a similar process is carried out with respect to Y-deflection and track 42. The two stored deflection voltages are thereafter applied to the deflection circuitry of block 9, placing the beam at the desired character, which is then scanned in a rastered fashion—as previously set forth. The location for writing this character is then examined and the beam deflected to this location via a similar index counting technique.

In the character locating scheme set forth above it will be appreciated that the beam is required to sweep in the direction of each track through a number of indexing marks until a correct count is reached which matches that of the digital input signal. For a given clock rate, this results in a positioning time which will depend on the number of index slots to be read. For example, if the target face is divided into 80 horizontal locations and the 79th location is desired, 79 clock pulses will have elapsed while the beam scans to reach this position. In order now to increase the speed with which coordinates can be located, an alternate indicia scheme, such as that shown in FIG. 5 can be used.

Figure 5:
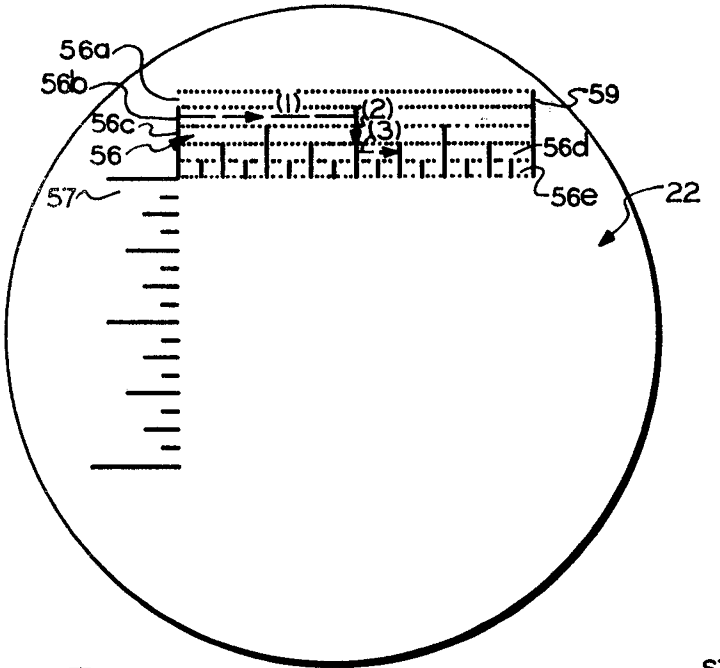
FIG. 5 is a partial plan view of the storage tube target, and illustrates an alternate embodiment for the indicia format present on such target.

In FIG. 5, from which details of target 22 are omitted with the exception of the coordinate indicia, it is seen that the indicia marks comprising tracks 56 and 57 are arranged therein in the form of a binary progression. Examining, for example, track 56 which extends in the X-direction, it is seen that the marks therein are of varying lengths, ranging in the portion of the track depicted from a unit length of 1 to a unit length of 5, and as shown by the dotted lines in the Figure, the track 56 can be regarded as containing parallel subtracks 56*a* through 56*e* in which the indicia marks are or are not present in accordance with the length thereof. Thus in the subtrack 56*a* a single mark 59 is present, representing $2^4$ or 16; in the track 56*b* a mark is present at $2^3$ or 8, and also in the extension of track 56*b* at $2\times2^3$ or 16; in track 56*c* a mark is present at $2^2$ or 4 and also in the extension of the track at $2\times2^2$, at $3\times2^2$ and at $4\times2^2$, in track 56*d* marks are similarly present at $2^1$, and at $n\times2^1$ for the length of the track; and in track 56*e* marks are simply present at $n\times2^0$ for the length of the track.

The digital location signal supplied from display central 3 is decoded in a sequential binary fashion. First the highest power digit column of the signal is examined. If a zero is present the beam remains at zero. If a "one" is present the beam moves in the subtrack corresponding to the power of the examined digit until it strikes the indicia mark therein. The next digit is then examined and the beam drops down to the next subtrack and performs a similar sweep according or not as whether said digit is a "one" or a "zero." This process continues with progressively lower power digits in the incoming digital signal until the entire signal is thus utilized. The process is graphically illustrated in FIG. 5 where beam movement is depicted for reaching the 1010 position. It is seen that the 1010 position is attained with only three sequential beam moves (segments (1), (2), and (3) of the figure). In general the beam is required to move only one position slot for each row. If the target face has, for example, 128 horizontal locations, only seven levels of decoding and seven counts are necessary to reach the desired position.

While in the above-described preferred embodiment of the invention, the individual characters in matrix 37 and the coordinate indicia are formed by voids or gaps in an otherwise continuous oxide layer, which gaps expose the underlying conductive substrate, the target may also be constructed with characters and indicia in the form of an oxide layer in an otherwise exposed conducting substrate. With such a target construction, it will of course be understood that a readout signal will be obtained which is generally the inverse of that secured where the preferred construction is utilized.

Figure 6:
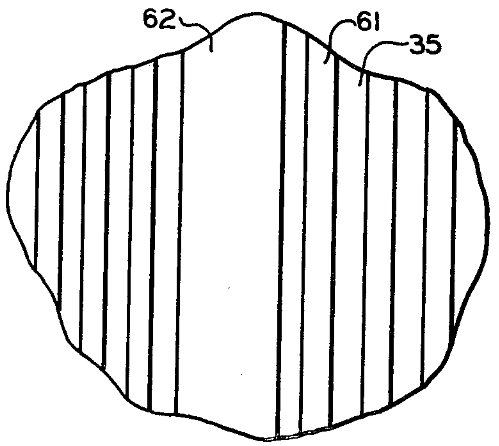
FIG. 6 is another partial, plan view of the storage tube target, and illustrates a still further embodiment for the beam-readable indicia present thereon.
Figure 7:
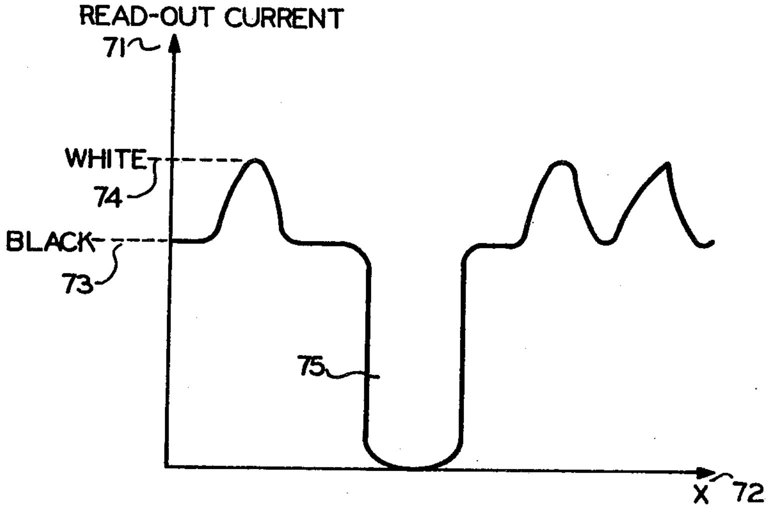
FIG. 7 is a graph depicting the manner in which the signal derived from reading of the FIG. 6 indicia may be identified.

FIG. 6 is a partial plan view of a storage target in accordance with the invention, and illustrates another technique pursuant to which beam-readable indicia may be placed on the hybrid tube target. In this embodiment the indicia are present directly at the storage area 35, which area in accordance with the teaching of my earlier cited copending application includes as the insulating mosaic layer 26 a series of parallel opaque silicon oxide strips 61, upon which strips the charge image to be stored is deposited. The indicia in this instance comprise a series of indicia strips—shown in the form of oxide strips 62—which are periodically interspersed with strips 61 but which are of considerably greater width than strips 61. Such oxide strips 62, as is seen in the FIG. 7 graph of readout current 71 versus coordinates position 72 during scanning of area 35, produce signals which in analogy to common television parlance may be termed "infrablack" in nature. In particular the black level 73 within the storage area 35 in this case consists of some minimum current level and the white level 74, a higher level of current, with the cited infrablack signals 75 falling well below the normal black level. An even more direct analog to the television terminology occurs where the indicia strips instead of comprising oxide, are in the form of voids in the oxide layer exposing underlying areas of conducting substrate. In this latter instance current pulses resulting from electron beam scanning across said voids will in the sense of FIG. 7 be in a positive direction, which will thus more nearly correspond to so-called "infrablack" levels in composite video waveforms. By using therefore any of the well-known techniques for separation and removal of infrablack signals from composite video waveforms or the like, the indicia signals from the indicia strips can be readily separated, and then treated in accordance with prior remarks. It should in this connection be pointed out that the technique set forth is preferably applicable to only one coordinate direction on the tube target, in that the pattern of FIG. 6 normally extends in but one direction. Accordingly indicia for the other coordinate direction is preferably arranged on a track in accordance with the FIGS. 3 and 5 embodiments, such track being conveniently located adjacent, for example, one edge of the storage portion of the target.

While the present invention has been particularly described in terms of specific embodiments thereof, it is apparent to those skilled in the art that numerous modifications are possible without departing from the spirit of the invention and the scope of the subjoined claims.

The embodiments of the invention in which an exclusive property or privilege is claimed are defined as follows:

1. A display system adapted for communication with a computer or the like, comprising;
- a. a hybrid storage tube, including
  1. an evacuated envelope,
  2. a target in said envelope having a data matrix area, an information storage area, and beam-readable coordinate indicia thereon,
  3. electron beam means and deflection circuitry for positioning said beam and scanning said target therewith, and
  4. readout terminal means for receiving readout signals from said storage area, said matrix area, or said indicia, in accordance with the area of said target scanned;
- b. electron beam position detector and control register means, connected to said readout terminal means, said deflection circuitry, and to a source of coordinate specification information, for receiving signals from reading of said indicia and determining said beam position, and for supplying positioning signals to said deflection circuitry upon said beam attaining coordinates corresponding to said specified coordinates;
- c. electron beam writing means, for impressing information on said beam in response to signals applied from said readout terminal means which are indicative of data from said matrix, whereby data from said matrix may be transferred to said storage area;
- d. CRT display means connected to said hybrid storage tube, for displaying said information read out from said storage area of said target; and
- e. display control means connected to said CRT display means, said hybrid storage tube, said deflection circuitry, said electron beam position detector and control register means, and said electron beam writing means, for providing coordinate specifications to said electron beam position detector and control register means, for controlling transfer of data from said matrix to said information storage area and read out from said storage area, and for activating said CRT display means to display said information read out from said storage area.

2. A system according to claim 1 wherein said matrix is alphanumeric in character.

3. A system in accordance with claim 1, wherein said target comprises a doped silicon substrate overcoated with a discontinuous layer of insulating silicon oxide, said discontinuities defining said symbols in said matrix area and defining said coordinate indicia, and said discontinuities defining in said storage area a mosaic of areas of insulating oxide upon which said symbols may be stored as an electrostatic charge pattern.

4. A system in accordance with claim 3 wherein said storage area comprises a first series of uniformly wide, spaced parallel oxide strips, and said indicia include a second series of parallel beam-readable strips, members of said second series being of a uniform width substantially greater than from that of members of said first series and being periodically interspersed among said first series, whereby said indicia may be detected by analysis of the signal resulting from scanning of said electron beam transverse to said strips.

5. System in accordance with claim 3 wherein said indicia comprise series of breaks in said oxide, each of said series extending in the direction of a coordinate axis on the face of said target.

6. System in accordance with claim 5 wherein said breaks are uniformly interspaced lines.

7. System in accordance with claim 5 wherein each of said series is subdivided into groups of $n$ subtracks, said $n^{th}$ subtrack having a sensible indicia at the coordinate corresponding to $2^{n-1}$, said $(n-1)$ *track having said indicia at* $(m)$ $2^{n-2}$, where $m$ is an integer, whereby a coordinate along said axis specified to said electron beam position detector means and control register as a binary number may be located by stepped unidirectional scanning of said tracks.

8. A display system adapted for communication with a computer or the like, comprising;
- a. a hybrid storage tube, including
  1. an evacuated envelope,
  2. a target in said envelope having a data matrix area, an information storage area, and beam-readable coordinate indicia thereon,
  3. electron beam means and deflection circuitry for positioning said beam and scanning said target therewith, and
  4. readout terminal means for receiving read out signals from said storage area, said matrix area, or said indicia, in accordance with the area of said target scanned;
- b. CRT display means connected to said readout terminal means, for displaying said information read out from said storage area of said target; and
- c. display control means connected to said CRT display means, and said hybrid storage tube, for directing positioning of said beam, scanning of said target, and transfer of data from said matrix to said storage area.

9. In an electronic display system of the type including an electronic storage tube having a target for storage of information thereon, read-in means for reading-in information for storage on said target, readout means to readout information from said target, and means to selectively transfer readout information to a display means; the improvement wherein:
- a said storage target includes a character matrix area thereon from which signals indicative of characters may be derived by electron beam scanning, whereby said character signals may be read out from said tube at said readout means; and
- said system includes buffer storage means electrically connected between said readout and read-in means, for temporarily holding said character signals whereby said character signals may be read out from said matrix area, and then read in to said storage area of said target for subsequent display.

* * * * *